(12) United States Patent
Morin et al.

(10) Patent No.: US 7,658,167 B2
(45) Date of Patent: Feb. 9, 2010

(54) FLUIDIZED-BED DEVICE WITH OXYGEN-ENRICHED OXIDIZER

(75) Inventors: Jean-Xavier Morin, Neuville Aux Bois (FR); Silvestre Suraniti, Aix En Provence (FR)

(73) Assignee: ALSTOM Technology Ltd, Baden (CH)

( * ) Notice: Subject to any disclaimer, the term of this patent is extended or adjusted under 35 U.S.C. 154(b) by 602 days.

(21) Appl. No.: 11/579,097

(22) PCT Filed: May 26, 2005

(86) PCT No.: PCT/FR2005/050374

§ 371 (c)(1),
(2), (4) Date: Oct. 27, 2006

(87) PCT Pub. No.: WO2005/119126

PCT Pub. Date: Dec. 15, 2005

(65) Prior Publication Data

US 2008/0000403 A1    Jan. 3, 2008

(30) Foreign Application Priority Data

May 28, 2004 (FR) .................................. 04 51057
Jul. 28, 2004 (FR) .................................. 04 51681

(51) Int. Cl.
*F23C 10/20* (2006.01)
(52) U.S. Cl. ....................... 122/4 D; 110/245
(58) Field of Classification Search ............. 122/4 D, 122/31.1, 34, 405; 110/245; 432/58; 423/239
See application file for complete search history.

(56) References Cited

U.S. PATENT DOCUMENTS

| | | | | |
|---|---|---|---|---|
| 4,021,193 A | * | 5/1977 | Waters | 432/58 |
| 4,259,088 A | * | 3/1981 | Moss | 48/212 |
| 4,336,769 A | * | 6/1982 | Daman | 122/4 D |
| 4,400,150 A | * | 8/1983 | Smith et al. | 431/170 |
| 4,628,831 A | | 12/1986 | Delessard et al. | |
| 4,780,966 A | | 11/1988 | Harding | |

(Continued)

FOREIGN PATENT DOCUMENTS

DE    3623177    7/1988

(Continued)

OTHER PUBLICATIONS

PCT International Search Report (PCT/FR2005/050374).

*Primary Examiner*—Gregory A Wilson
(74) *Attorney, Agent, or Firm*—Robert D. Crawford

(57) ABSTRACT

The invention relates to a fluidized-bed device (F1, F2) provided with a hearth (1, 23) equipped with gas mixture feeds called primary feeds, said gas mixture being enriched with oxygen, and said hearth (1, 23) being provided with a network of two types of primary feed nozzle, a first type of nozzle (B1, B'1) injecting a first gas mixture at a first level close to the hearth (1, 23) and a second type of nozzle (B2, B'2) injecting a second oxygen-enriched gas mixture at a second level above the first level.

According to the invention, said second type of nozzle (B2, B'2) consists of a device for mixing oxygen with a second gas component and connected by its lower end to an oxygen feed (11A, 11A') and to a feed of second gas component, and of a device for injecting this mixture into the combustion chamber.

27 Claims, 7 Drawing Sheets

U.S. PATENT DOCUMENTS

| | | | |
|---|---|---|---|
| 4,854,249 A | | 8/1989 | Khinkis et al. |
| 4,947,803 A | * | 8/1990 | Zenz .......................... 122/4 D |
| 4,969,930 A | * | 11/1990 | Arpalahti .................. 48/197 R |
| 5,957,066 A | * | 9/1999 | Nagato et al. ............... 110/245 |
| RE37,300 E | * | 7/2001 | Nagato et al. ............... 122/4 D |
| 7,240,639 B2 | * | 7/2007 | Hyppanen et al. ........... 122/4 D |
| 7,410,356 B2 | * | 8/2008 | Higgins et al. ................ 432/17 |
| 2007/0175411 A1 | * | 8/2007 | Morin et al. ................ 122/4 D |

FOREIGN PATENT DOCUMENTS

| | | |
|---|---|---|
| DE | 4211646 | 10/1993 |
| EP | 0384454 | 8/1998 |
| GB | 1600025 | 10/1981 |

\* cited by examiner

FLUIDIZED-BED DEVICE WITH OXYGEN-ENRICHED OXIDIZER

BACKGROUND OF THE INVENTION

The present invention relates to a fluidized-bed device with oxygen-enriched oxidizer. Fluidized-bed device here means both a circulating fluidized-bed combustion chamber and a dense fluidized-bed combustion chamber.

The development of new regulations limiting greenhouse gas emissions, including carbon dioxide in fossil fuel power plants, is leading to the implementation of technologies for capturing the carbon dioxide present in air combustion flue gases.

The frequently used carbon dioxide capture technology consists in scrubbing the flue gases diluted with nitrogen from the combustion air using solvents which absorb the carbon dioxide and then restore it as a concentrated carbon dioxide gas stream after regenerating the solvent by heating.

This method consumes a considerable amount of energy and substantially reduces the efficiency of fossil fuel power plants, namely reducing the efficiency by more than 15 percentage points.

U.S. Pat. No. 4,498,289 and U.S. Pat. No. 5,175,995 teach the use of oxygen as oxidizer instead of air in power generation boilers.

The advantage of using oxygen as oxidizer is the reduction, to the point of elimination, of the nitrogen ballast diluting the carbon dioxide present in the flue gases and originating from the nitrogen present in the combustion air, and the substantial reduction of the size of the necessary equipment.

The application of this principle to a circulating fluidized-bed boiler is disclosed in U.S. Pat. No. 6,505,567. According to this document, a fluidized-bed combustion chamber or steam generator comprises means for introducing substantially pure oxygen into the generator.

The advantage of the circulating fluidized-bed technique is that it allows the extraction of the heat on the circulating solids loop and the maintenance of a low combustion temperature, independently of the oxygen content of the oxidizer. Hence this technique is particularly attractive and serves to maximize the fraction of oxygen in the oxidizer and to minimize the size of the boiler which depends directly on the flow rate of flue gases produced.

However, in this prior document, no details are provided concerning these injection means.

In fact, this oxygen injection into the combustion chamber is particularly difficult and the creation of local hot spots is liable to cause caking of the bed and destruction of the injection nozzles. In fact, the medium of a circulating fluidized bed is not a perfectly stirred medium in practice, despite the high solids concentration which guarantees local turbulence.

Furthermore, this injection must ensure an appropriate oxygen distribution over the cross section of the combustion chamber. The contacting and the reaction of the fuel introduced into the bed with the oxidizer is essential for the satisfactory progress of the reactions and, in particular, to minimize the formation of nitrogen oxides and maximize the conversion of desulfurization limestone injected into the combustion chamber.

U.S. Pat. No. 4,628,831 describes a fluidized-bed device provided with a hearth equipped with gas mixture feeds called primary feeds, said gas mixture containing oxygen, said hearth being provided with a network of two types of primary feed nozzles, a first type of nozzle injecting the gas mixture at a first level close to the hearth and a second type of nozzle injecting the gas mixture at a second level above the first level.

According to that document, the gas mixture must be prepared upstream in large volumes. This implies a large overall size of the boiler.

Added to this are safety problems inherent in the presence of large volumes of oxygen-concentrated gases.

SUMMARY OF THE INVENTION

The invention solves these technical problems and, for this purpose, it proposes a fluidized-bed device provided with a hearth equipped with gas mixture feeds called primary feeds, said gas mixture being enriched with oxygen, and said hearth being provided with a network of two types of primary feed nozzle, a first type of nozzle injecting a first gas mixture at a first level close to the hearth and a second type of nozzle injecting a second oxygen-enriched gas mixture at a second level above the first level, characterized in that said second type of nozzle consists of a device for mixing oxygen with a second gas component and connected by its lower end to an oxygen feed and to a feed of second gas component, and of a device for injecting this mixture into the combustion chamber.

The two types of nozzle installed on the hearth of the device inject the gases at different height levels to ensure optimal fluidization conditions. In fact, it is essential for the upper injections of oxygen-enriched mixture by the second type of nozzle to take place in a medium already fluidized by the first type of nozzle injecting the first gas mixture, that is air or carbon dioxide. Thanks to the invention, the oxygen is dissipated in a turbulent mixing medium.

This feature serves to inject the oxygen directly into the combustion chamber without the need for previous premixing in large volumes. Greater compactness of the boiler and increased safety are thereby achieved.

Furthermore, the mixing function is thereby dissociated from the injection function in the nozzle. The design of the nozzle is thereby facilitated, as regards the pressure drops at the gas orifices and the prevention of the return of solids via these orifices.

According to a preferred embodiment, these two gas mixtures are different.

According to a preferred embodiment, the device is provided with at least one oxidizer feed called secondary feed, and said secondary feed also injects an oxygen-enriched mixture.

In the case of a circulating fluidized-bed combustion chamber, such a secondary feed in the expanded part of the combustion chamber is preferred to a tertiary feed in the cylindrical part of the combustion chamber, this expanded part being generally equipped with a refractory lining. However, this other type of tertiary oxidizer feed is also feasible.

Several secondary and, optionally, tertiary feeds may be arranged at different height levels of the combustion chamber, above the primary hearth, to ensure appropriate staging of the oxygen over the height of the combustion chamber.

Advantageously, said secondary feed consists of a nozzle comprising a double concentric tube for injecting said oxygen-enriched mixture into the inner tube and for injecting the first gas mixture into the outer tube.

Said oxygen-enriched mixture may contain 21 to 100% of oxygen.

Said oxygen-rich mixture may comprise a second gas component consisting of carbon dioxide and said first gas mixture may be carbon dioxide.

Said oxygen-rich mixture may comprise a second gas component consisting of nitrogen and said first gas mixture may be carbon dioxide.

Said oxygen-rich mixture may be oxygen-enriched air and said first gas mixture may be air.

Advantageously, said mixing device consists of two substantially vertical concentric tubes of which the outer tube is closed at its upper end and provided with orifices on its side wall.

Advantageously, said injection device consists of a cap covering said mixing device and provided with orifices in its upper part.

According to a second variant, said second type of nozzle consists of two substantially vertical concentric tubes of which the outer tube is provided with orifices on its side wall.

Preferably, said concentric tubes are covered with a cap provided with orifices in its upper part.

Advantageously, said cap is provided with an internal wall for forming a baffle.

Preferably, said oxygen feed is provided by a manifold to which the inner concentric tube is connected.

Said feed of second gas component may be provided by direct connection of the outer concentric tube to said windbox filled with second gas component or by a manifold to which the outer concentric tube is connected.

The oxygen-enriched mixture may contain water vapor and/or sulfur dioxide.

The risk of formation of hot spots in the combustion chamber close to the injection points is thereby further reduced. This water injection in fact promotes a local gasification of the fuel by decreasing the oxygen partial pressure.

The invention further relates to a circulating fluidized-bed combustion chamber as described above.

According to a first application, a circulating fluidized-bed boiler comprising such a circulating fluidized-bed combustion chamber and a dense fluidized bed with a heat exchanger and receiving solids at the outlet of a cyclone, said dense fluidized bed is provided with at least one secondary feed injecting an oxygen-enriched mixture into its return line to the circulating fluidized-bed combustion chamber.

The invention further relates to a dense fluidized bed with a heat exchanger as described above.

The invention finally relates to a second application consisting of a circulating fluidized-bed boiler comprising such a circulating fluidized-bed combustion chamber and an associated dense fluidized bed with a heat exchanger and receiving solids at the outlet of a cyclone.

Said dense fluidized bed may be provided with at least one secondary feed injecting an oxygen-enriched mixture above the bed.

Said combustion chamber with dense fluidized-bed heat exchanger may be provided with at least one secondary feed injecting an oxygen-enriched mixture into its return line to the circulating fluidized-bed combustion chamber.

The invention finally relates to a circulating fluidized-bed boiler comprising a circulating fluidized-bed combustion chamber as described above and a dense fluidized bed receiving solids at the outlet of a cyclone, characterized in that the dense bed is fluidized by air or a component thereof.

The invention therefore proposes a device for optimizing the oxygen consumption while preserving the advantages of airless combustion.

According to a preferred embodiment, the dense bed is fluidized by nitrogen.

Advantageously, this nitrogen is obtained from a cryogenic air separation unit which supplies oxygen to the boiler. This fluidization with nitrogen serves to avoid post-combustion of the carbon present in the dense bed, which could lead to carbon dioxide leakage from the stack and to a lower overall carbon dioxide capture efficiency.

Preferably, the fluidization gas of the dense bed is cooled in a heat exchanger before release to the atmosphere.

The particles of the dense bed may be separated from the fluidization gas before injection into the combustion chamber.

The particles may be separated from the fluidization gas by a siphon.

Advantageously, the siphon is fluidized by a gas mixture composed of $O_2/CO_2$.

BRIEF DESCRIPTION OF THE DRAWINGS

The invention is described below in greater detail with the aid of figures representing only one preferred embodiment of the invention.

DETAILED DESCRIPTION OF THE PREFERRED EMBODIMENT

The invention preferably relates to a fluidized-bed device in which combustion takes place by means of a mixture of oxygen and carbon dioxide or nitrogen with fluidization injection of carbon dioxide. It further relates to a fluidized-bed device in which combustion is effected by means of oxygen-enriched air with fluidization injection of air.

Figure 1:
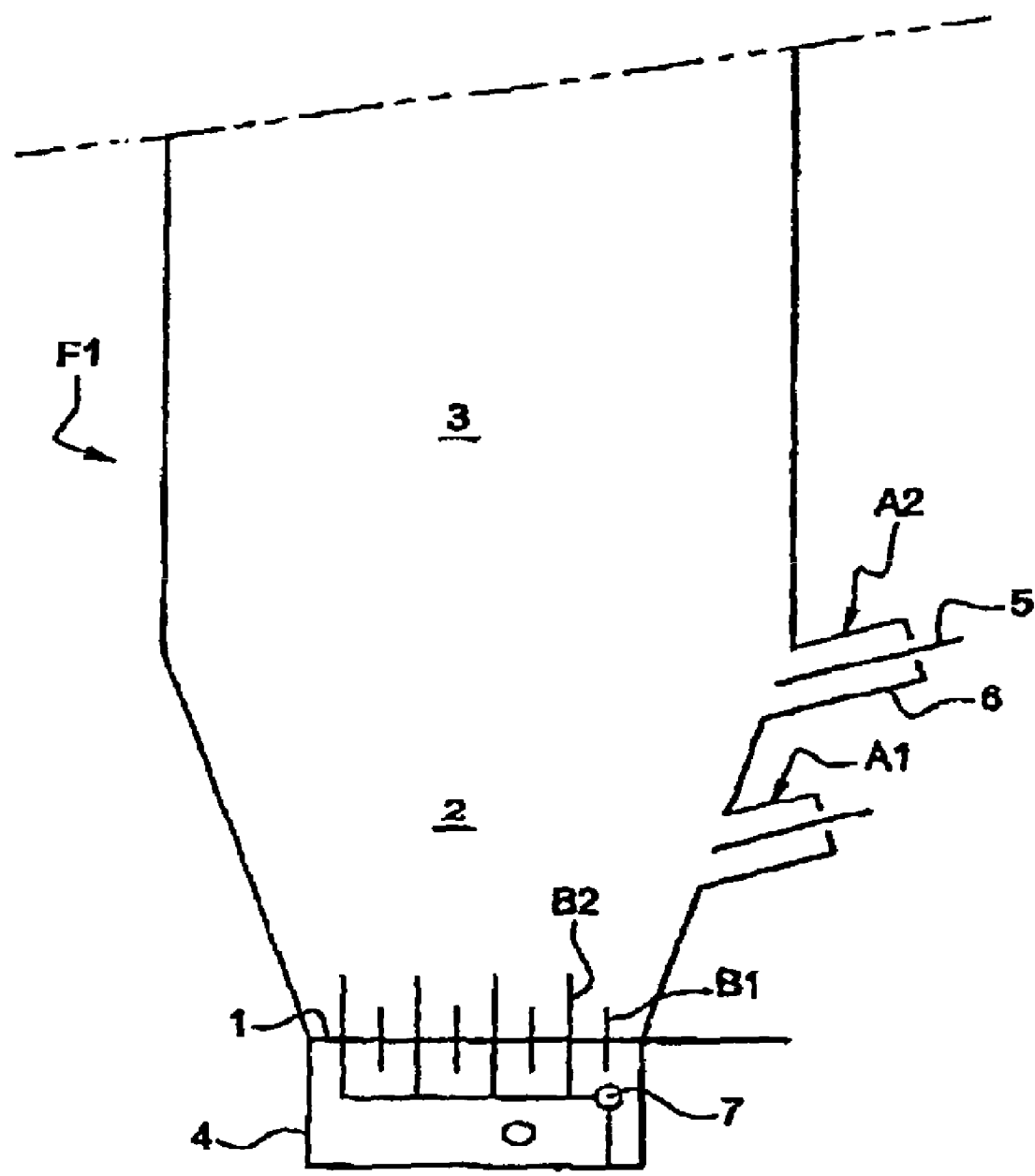
FIG. 1 is a schematic view of a vertical cross section of a circulating fluidized-bed boiler combustion chamber according to the invention.

A circulating fluidized-bed boiler combustion chamber shown schematically in FIG. 1 is provided with a hearth 1 consisting of a solid or tubular cooling wall and equipped with oxidizer feeds called primary feeds and surmounted by a first expanded part 2 provided with at least one oxidizer feed called secondary feed and itself surmounted by a cylindrical part 3. A box called a windbox 4 and filled with pressurized gas is arranged under the hearth 1.

The hearth 1 is provided with a network of two types of primary feed nozzle, a first nozzle type B1 injecting air or carbon dioxide at a first level close to the hearth and a second nozzle type B2 injecting an oxygen-enriched mixture at a second level above the first level. The nozzles B1 of the first type are of known design and directly supplied by the windbox 4 filled with pressurized air or carbon dioxide. The nozzles B2 of the second type are supplied here, on the one hand, by a common oxygen inlet manifold 7 and, on the other, with a second gas component, either directly by the windbox 4, or by a common manifold which may be located in the windbox 4. These various nozzles are described in greater detail below.

The combustion chamber comprises secondary feeds A1, A2 also injecting an oxygen-enriched mixture. These secondary feeds each consist of a nozzle comprising a double concentric tube for injecting said oxygen-enriched mixture, advantageously even pure oxygen, into the inner tube 5 and for injecting air or carbon dioxide into the outer tube 6.

The oxygen-enriched mixture may contain 21 to 100% of oxygen, the other fraction consisting of carbon dioxide or nitrogen.

Figure 2:
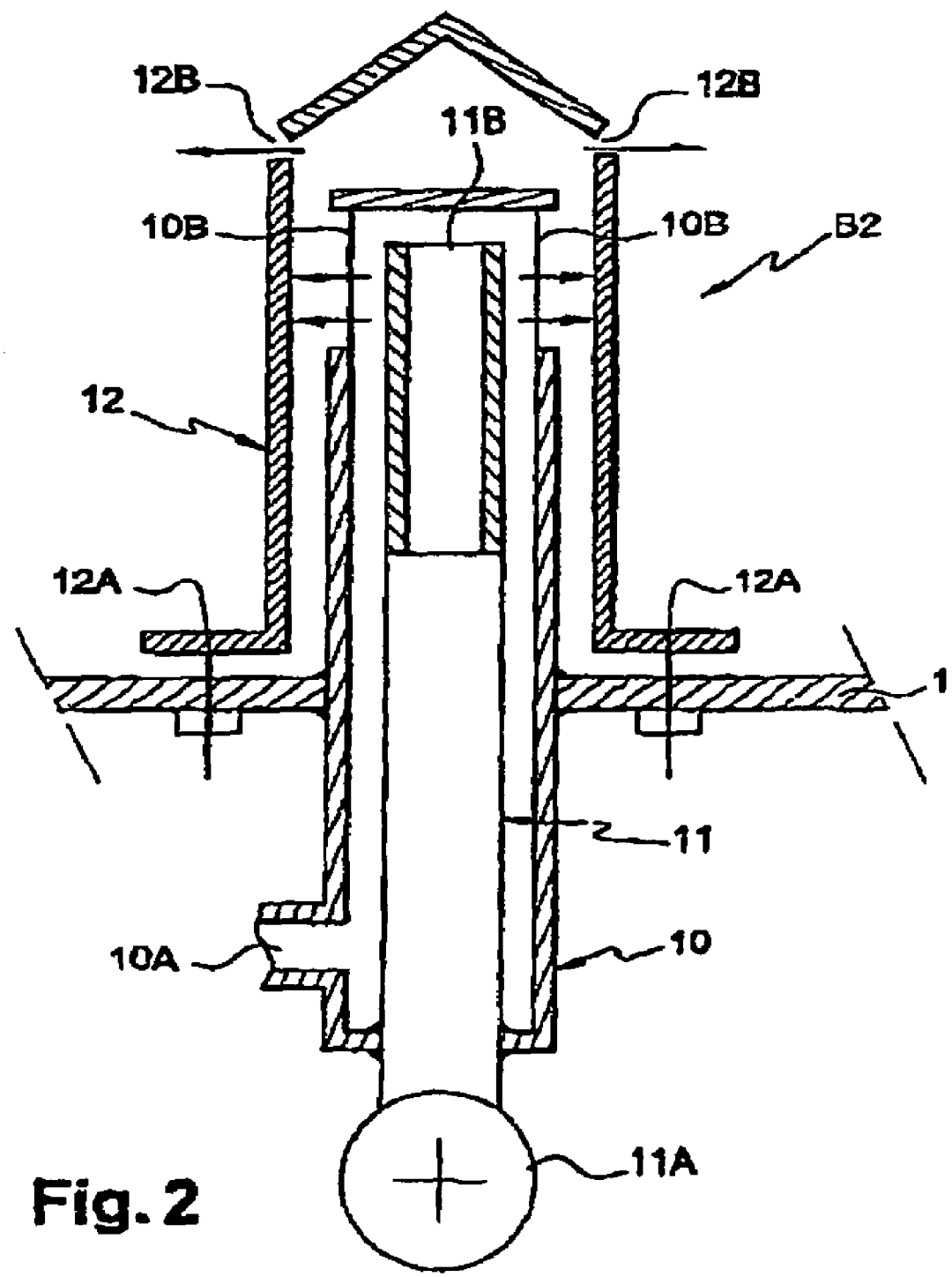
FIG. 2 shows a vertical cross section of a second type of nozzle installed in the hearth of a combustion chamber of a circulating fluidized-bed boiler according to a first variant of the invention.

FIG. 2 shows a first variant of a second type of nozzle B2 for injecting oxygen-enriched mixture.

This nozzle B2 consists of a device for mixing oxygen with the second gas component and connected by its lower end to an oxygen feed and to a second gas component feed, and of a device for injecting this mixture into the combustion chamber.

More precisely, the mixing device consists of two substantially vertical concentric tubes of which the outer tube 10 passes through the hearth of the combustion chamber 1 and is closed at both its ends. This outer tube 10 is connected at its lower part to an inlet 10A of second gas component from the windbox 4 or from a manifold that may be located in said windbox.

In its upper part, this tube 10 is provided with orifices 10B on its side wall for gas escape. Advantageously, the orifices 10B are distributed around the tube 10 and at several levels.

The inner tube 11 of these two concentric tubes passes through the lower closure wall of the outer tube 10 and extends along most of the height of this outer tube 10. It is connected at its lower end to an oxygen manifold 11A, located in the windbox 4 and is open at its upper end 11B from where the oxygen escapes. At this escape point, the oxygen is mixed with the second gas component and an oxygen-enriched gas mixture issues through the orifices 10B.

The injection device consists of a cap 12 covering the mixing device, fixed in a sealed manner to the hearth 1, for example by screwing or welding, and provided with orifices 12B in its upper part through which the gas mixture is injected into the combustion chamber. Advantageously, the orifices 12B are distributed around the cap 12. By dismantling this cap 12, it is easily possible to reach the interior of the nozzle B2.

Figure 3:
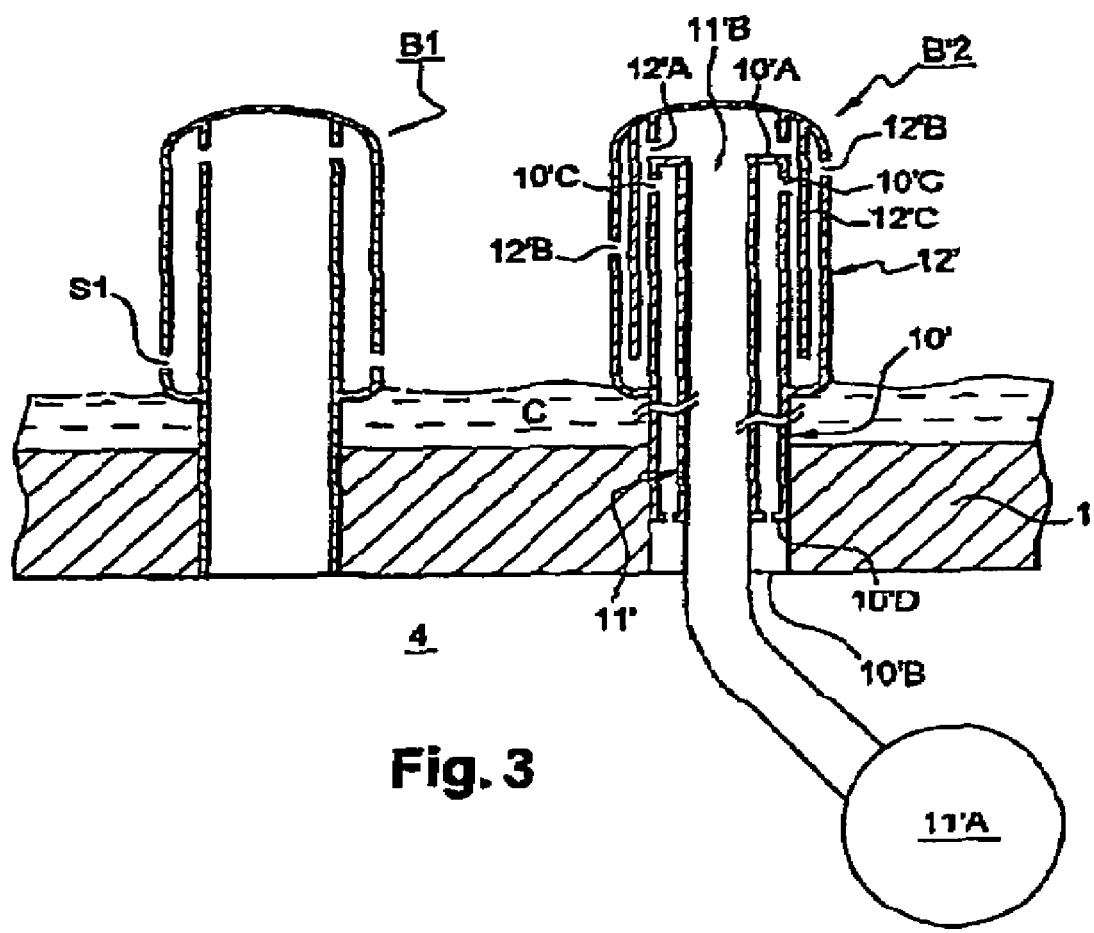
FIG. 3 shows a vertical cross section of a second type of nozzle installed in the hearth of a combustion chamber of a circulating fluidized-bed boiler according to a second variant of the invention.

FIG. 3 shows a second variant of a second type of nozzle B2 for injecting oxygen-enriched mixture.

This figure also shows a first type of nozzle B1 known per se injecting air or carbon dioxide via the outlet orifices S1.

The second type of nozzle B'2 consists of two substantially vertical concentric tubes of which the outer tube 10' passes through the hearth of the combustion chamber 1 and is closed at its upper end by a wall 10'A. This outer tube 10' is fixed by its lower end in a sealed manner to the hearth 1 and is fed with second gas component issuing from the windbox 4.

In its upper part, this tube 10' is provided with orifices 10'C on its side wall for gas escape. Advantageously, the orifices 10'C are distributed around the tube 10' and at several levels.

The inner tube 11' of these two concentric tubes extends along the entire height of this outer tube 10' and is guided in this outer tube by spacers 10'D at the hearth 1. This system of spacers can advantageously perform a function of blocking the return of solids thanks to an annular type of geometry comprising orifices distributed on the periphery. It is connected at its lower end to an oxygen manifold 11'A located in the windbox 4 and is open at its upper end 11'B where the oxygen escapes.

Above this unit is placed a cap type of element 12' which, in its upper part, forms orifices 12'A for the lateral outlet of oxygen toward a lateral space inside this cap where the oxygen and second gas component are mixed before escaping via the side orifices 12'B of the cap where the oxygen-enriched mixture is injected into the combustion chamber. Advantageously, the side orifices 12'A, 12'B are distributed along the periphery of the element bearing them. Advantageously, a vertical cylindrical wall 12'C is placed in this internal lateral space of the cap, thereby providing a baffle and turbulence improving the mixing of the two gases.

According to an essential feature, the first type of nozzle B1 injects the first gas mixture at a first level close to the hearth 1, corresponding to the height of the orifices S1, and the second type of nozzle B'2 injects the oxygen-enriched mixture at a second level above the first level and corresponding to the height of the orifices 12'B. The upper injections of oxygen-enriched mixture by the second type of nozzle B'2 thereby take place in a medium already fluidized by the nozzles of the first type B1 injecting the first gas mixture. This is shown schematically in FIG. 3, by a representation of a nonfluidized layer C on the hearth 1 outside which the injection orifices 12'B of the second type of nozzle B'2 are arranged. This injection height can be adjusted and determined by choosing the position of these orifices 12'B in the cap 12 and/or by choosing the height of the nozzle B'2 itself.

In the preceding description of nozzles B'2, the dimensions and gas feed pressures are calculated and selected so that the oxygen-rich mixture contains 21 to 100% of oxygen, the other fraction consisting of carbon dioxide or nitrogen, the mixture thereby corresponding to enriched air.

Since the pressure at the bottom of the combustion chamber can reach 800 mbar, the dimensions of the gas outlet orifices are also determined to prevent the passage or return of gas and/or solids into the nozzles, the transfer speeds being selected between 10 and 100 m/s.

The oxygen-enriched mixture injected into the combustion chamber may contain water vapor, to avoid the formation of hot spots.

Figure 4:
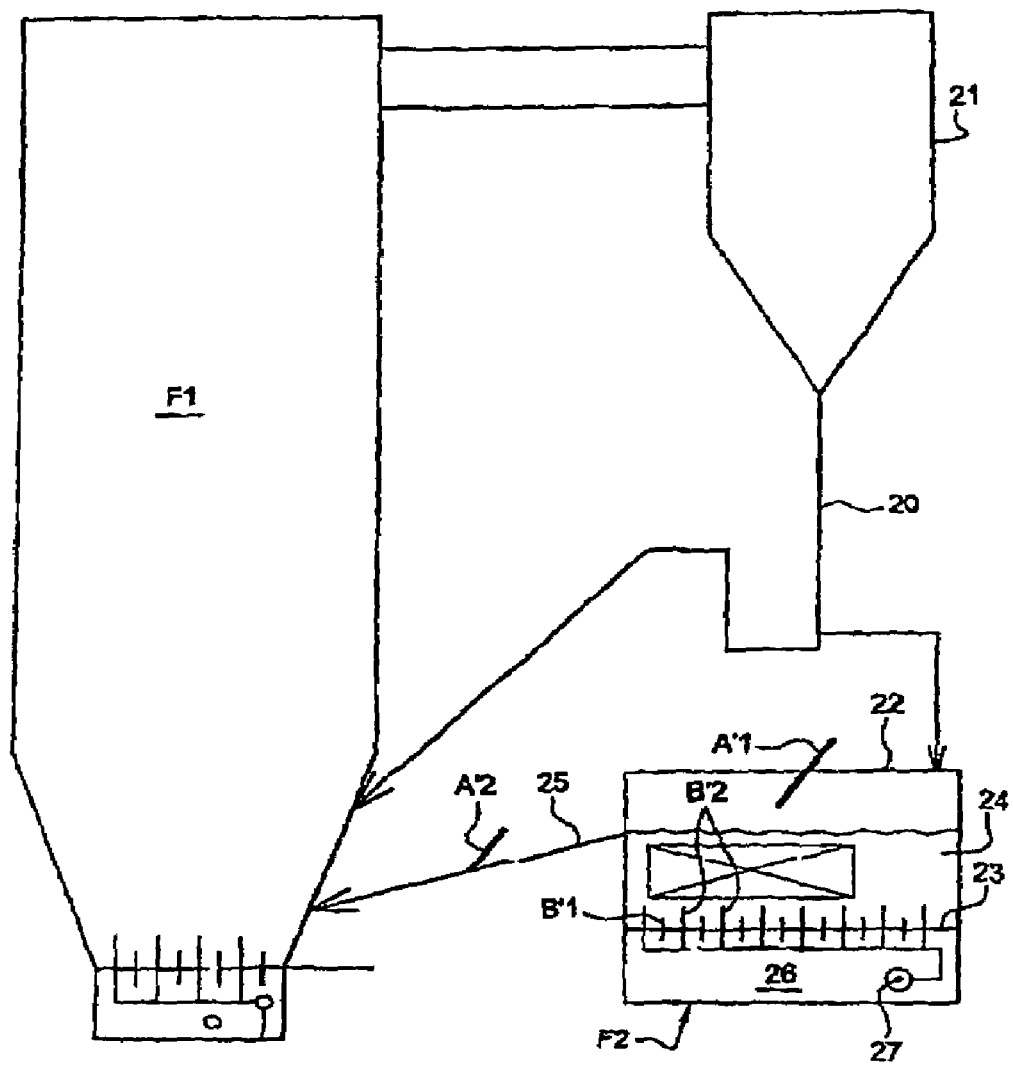
FIG. 4 is a schematic view of a vertical cross section of a circulating fluidized-bed boiler comprising a circulating fluidized-bed combustion chamber and a dense fluidized bed with a heat exchanger receiving solids at the outlet of a cyclone, according to the invention.

FIG. 4 shows a first embodiment of a fluidized-bed boiler according to the invention.

The device F2 is a dense fluidized bed associated here with a circulating fluidized-bed combustion chamber F1.

This dense fluidized bed F2 also comprises a hearth 23 provided with a network of two types of primary feed nozzle, a first type of nozzle B'1 injecting air or carbon dioxide at a first level close to the hearth, and a second type of nozzle B'2 injecting an oxygen-enriched mixture at a second level above the first level. The nozzles B'1 of the first type are of known design and are directly fed by the windbox 26 filled with pressurized air or carbon dioxide. The nozzles B'2 of the second type are fed here, on the one hand, by a common oxygen inlet manifold 27 and, on the other, with second gas component, either directly by the windbox 26, or by a common manifold which may be located in the windbox 26. These various nozzles are preferably of the same type as those already described above and shown in FIGS. 2 and 3. This dense fluidized bed F2 also comprises at least one secondary feed A'1 also injecting an oxygen-enriched mixture.

In its specific application shown in FIG. 4, this dense fluidized-bed heat exchanger F2 is associated with a circulating fluidized-bed combustion chamber F1 and serves to control the temperatures of the circulating fluidized-bed combustion chamber F1. The solids contained in the flue gases leaving the combustion chamber F1 are separated in a cyclone 21 and returned to the bottom of the combustion chamber F1 by a siphon 20. The base of the siphon 20 is provided with an extraction of solids at a flow rate controlled by a valve. The solids extracted are also transferred to the dense fluidized bed F2 in a heat exchanger immersed in its bed 24. The cooled solids leave the bed and are transferred via a line 25 to the circulating fluidized-bed combustion chamber F1. An additional injection of oxygen-enriched gas mixture can also be made in the overhead 22 above the bed 24 of the dense bed with the heat exchanger F2 and in the overhead of the line 25, by nozzles A'1 and A'2 similar to those already described as secondary nozzles for the circulating fluidized-bed combustion chamber F1.

Figure 5:
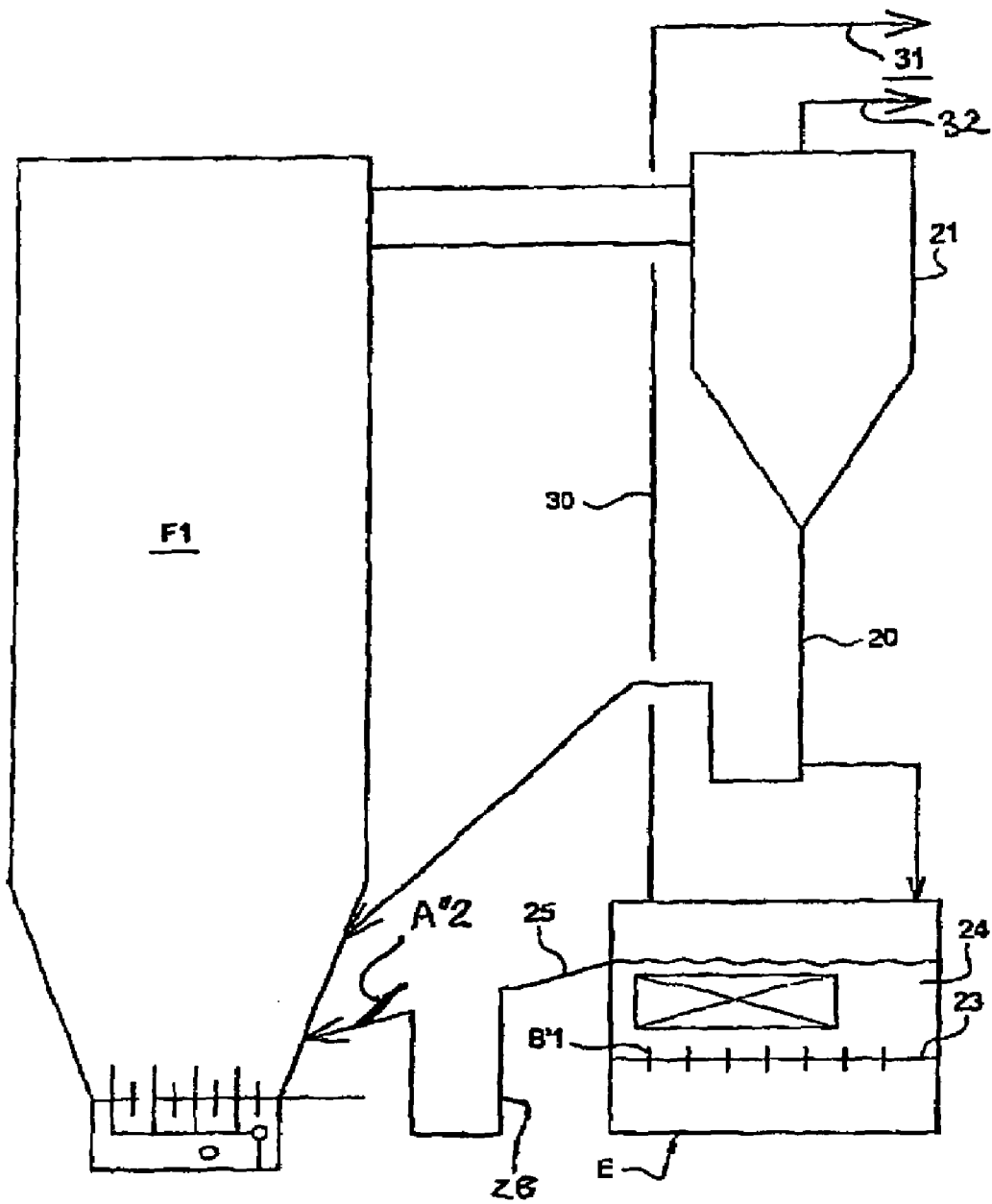
FIG. 5 is a schematic view of a vertical cross section of a circulating fluidized-bed boiler comprising a circulating fluidized-bed combustion chamber and a dense fluidized bed receiving solids at the outlet of a cyclone, according to the invention, in another variant.

FIG. 5 shows a second embodiment of a fluidized-bed boiler according to the invention.

In this application, a dense fluidized bed E with a heat exchanger is associated with a circulating fluidized-bed combustion chamber F1 and serves to control the temperatures of the circulating fluidized-bed combustion chamber F1. The solids contained in the flue gases leaving the combustion chamber F1 are separated in a cyclone 21 and conveyed to the bottom of the combustion chamber F1 by a fluidized siphon 20 providing air- and carbon dioxide atmosphere-tightness between the dense bed and the circulating fluidized-bed combustion chamber F1. The base of the siphon 20 is equipped with a solids extraction at a flow rate controlled by a valve. The solids extracted are transferred to a dense fluidized bed E containing a heat exchanger immersed in its bed 24. The cooled solids leave the bed and are transferred via a line 25 to the circulating fluidized-bed combustion chamber F1 via a fluidized siphon 28 which provides a seal between the dense bed and the circulating fluidized-bed combustion chamber. An additional injection of oxygen-enriched gas mixture can also be made in the overhead of the line 25 downstream of the siphon 28, by a nozzle A"2 similar to the one already described as secondary nozzles for the circulating fluidized-bed combustion chamber F1 in this line 25.

In this variant, the dense fluidized bed E is equipped with a specific vent 30 for venting the fluidization gas toward the rear cage 31 of the boiler to avoid diluting the carbon dioxide produced in the combustion chamber with the nitrogen present in this gas. This variant has the advantage of not using recycled carbon dioxide for fluidizing the dense bed exchangers. Contrary to the variant in FIG. 4, this carbon dioxide is accordingly preserved for the oxygen-rich gas mixture feed to the combustion chamber and serves to decrease the oxygen concentration of the gas mixture.

Figure 6:
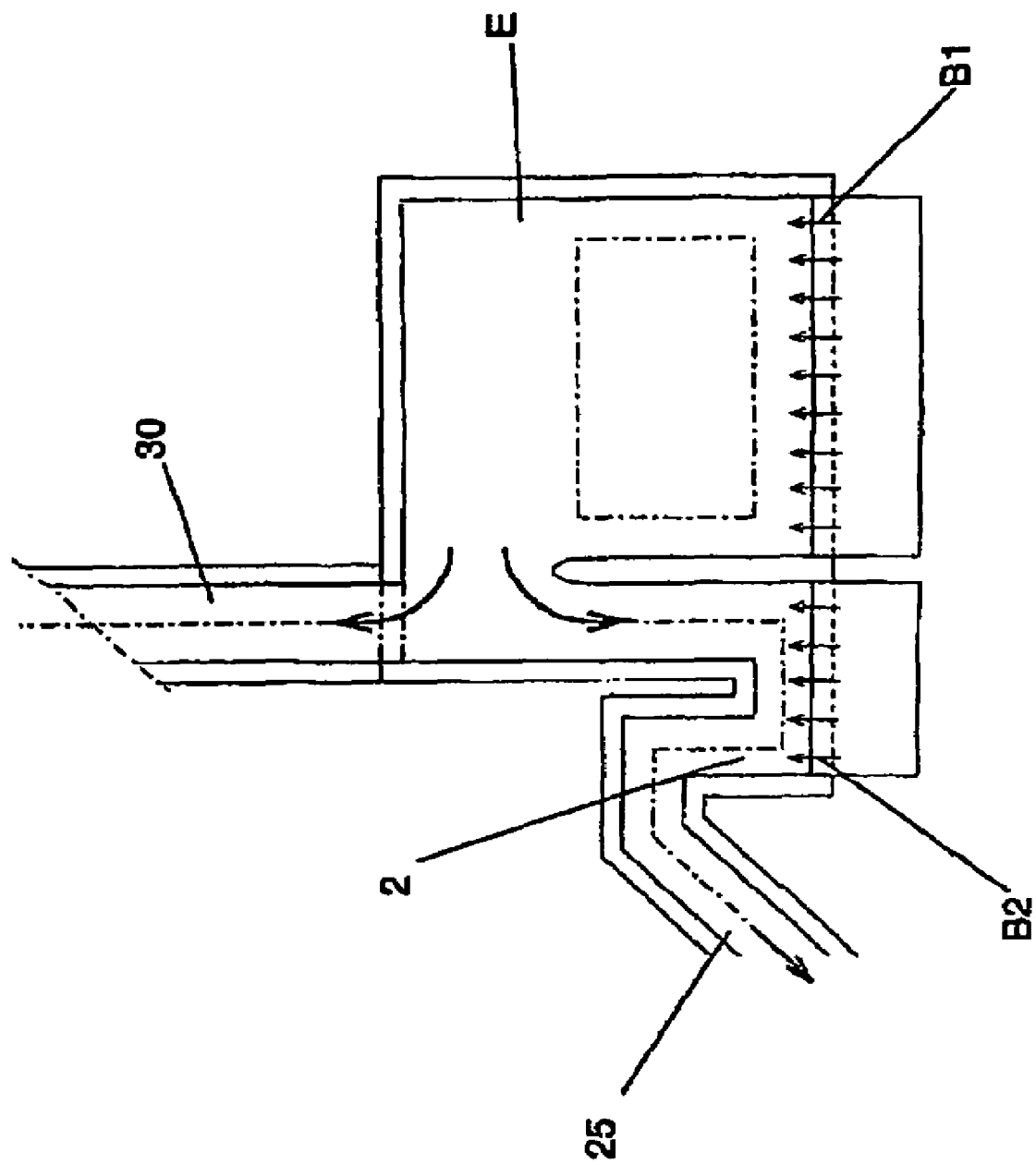
FIG. 6 is a detailed view of the dense bed and its siphon.

FIG. 6 shows that the dense fluidized bed E is equipped with a specific vent 30 for removing the fluidization air or nitrogen, arriving via B1, toward a specific rear cage 31 of the boiler to avoid diluting the carbon dioxide produced in the combustion chamber with this gas. The siphon 2 is fluidized by a gas mixture comprising $O_2/CO_2$, this mixture arrives via fluidization nozzles B2. The use of the $O_2/CO_2$ gas to fluidize permits a substitution of the air or nitrogen remaining between the solid particles by said gas and thereby to ensure that all the fluidization gas of the dense bed is properly removed without returning to the combustion chamber F1. The solid particles return toward the combustion chamber F1 via a solids return 25.

Figure 7:
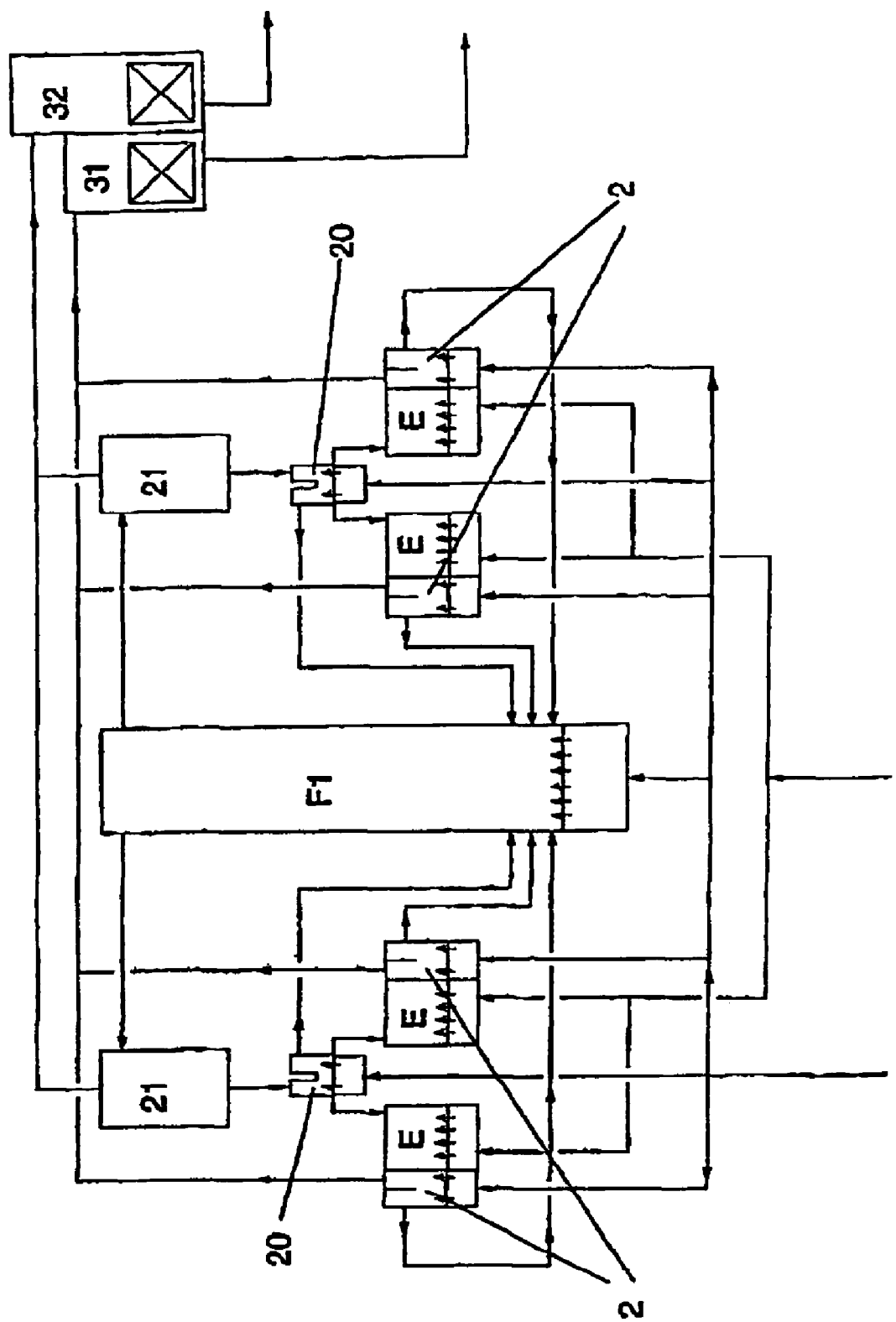
FIG. 7 is a schematic view of an exemplary embodiment.

FIG. 7 shows an exemplary embodiment according to the invention, in which the combustion chamber F1 has two separators 21 each with a siphon 20. Each siphon 20 is connected to two external beds E each having a siphon 2. Thus the solids circulation loop is duplicated, each loop comprising a separator 21 and a siphon 20. The solids extraction from each siphon 20 can also be duplicated, as in FIG. 3. Each siphon 20 thereby comprises two outlets at flow rates each controlled by a valve and feeds two external beds E. Each external bed E is fluidized by air or nitrogen and followed by a siphon 2.

The invention claimed is:

1. In a fluidized-bed device including a combustion chamber and a hearth equipped with primary gas feeds wherein the gas mixture is enriched with oxygen, the improvement comprising:
a first type of nozzle through which a first gas mixture is injected at a first level located close to the hearth; and
a second type of nozzle through which an oxygen-enriched second gas mixture is injected at a second level located above the first level that is located close to the hearth, the second type of nozzle including a first device for mixing oxygen with a second gas component and a second device for injecting the mixture of oxygen and the second gas component into the combustion chamber of the fluidized-bed device, and the first device having a lower end connected to an oxygen feed and to a feed of a second gas component.

2. In the fluidized-bed device, the improvement as claimed in claim 1 wherein the first gas mixture and the oxygen-enriched second gas mixture are different.

3. In the fluidized-bed device, the improvement as claimed in claim 1 further comprising at least one secondary oxidizer feed through which an oxygen-enriched mixture is injected.

4. In the fluidized-bed device, the improvement as claimed in claim 3 wherein the at least one secondary oxidizer feed comprises a nozzle consisting of a double concentric tube that includes an inner tube and an outer tube, and wherein the oxygen-enriched mixture is injected into the inner tube of the double concentric tube and the first gas mixture is injected into the outer tube of the double concentric tube.

5. In the fluidized-bed device, the improvement as claimed in claim 4 wherein the oxygen-enriched mixture contains 21% to 100% of oxygen.

6. In the fluidized-bed device, the improvement as claimed in claim 4 wherein the oxygen-enriched mixture comprises a second gas component consisting of carbon dioxide, and wherein the first gas mixture consists of carbon dioxide.

7. In the fluidized-bed device, the improvement as claimed in claim 4 wherein the oxygen-enriched mixture comprises a second gas component consisting of nitrogen, and wherein the first gas mixture consists of carbon dioxide.

8. In the fluidized-bed device, the improvement as claimed in claim 4 wherein the oxygen-enriched mixture consists of oxygen-enriched air, and wherein the first gas mixture consists of air.

9. In the fluidized-bed device, the improvement as claimed in claim 1 wherein the first device for mixing oxygen with a second gas component comprises two substantially vertical concentric tubes and wherein the outer tube of the two substantially vertical concentric tubes has an upper end and a side wall and the upper end thereof is closed and orifices are provided in the side wall thereof.

10. In the fluidized-bed device, the improvement as claimed in claim 1 wherein the second device for injecting the mixture of oxygen and the second gas component into the combustion chamber of the fluidized-bed device has an upper part, and wherein the second device for injecting the mixture of oxygen and the second gas component into the combustion chamber of the fluidized-bed device is covered with a cap and orifices are provided in the upper part thereof.

11. In the fluidized-bed device, the improvement as claimed in claim 1 wherein the second type of nozzle comprises two substantially vertical concentric tubes and wherein the outer tube of the two substantially vertical concentric tubes has a side wall and orifices are provided in the side wall thereof.

12. In the fluidized-bed device, the improvement as claimed in claim 11 wherein the two substantially vertical concentric tubes have an upper part and wherein the two substantially vertical concentric tubes are covered with a cap and orifices are provided in the upper part thereof.

13. In the fluidized-bed device, the improvement as claimed in claim 12 wherein the cap is provided with an internal wall in the form of a baffle.

14. In the fluidized-bed device, the improvement as claimed in claim 1 wherein the oxygen feed is provided from a manifold to which the lower end of the first device is connected.

15. In the fluidized-bed device, the improvement as claimed in claim 1 wherein the feed of the second gas component is provided through a direct connection of the lower end of the first device to a windbox filled with the second gas.

16. In the fluidized-bed device, the improvement as claimed in claim 1 wherein the feed of the second gas component is provided from a manifold to which the lower end of the first device is connected.

17. In the fluidized-bed device, the improvement as claimed in claim 1 wherein the oxygen-enriched mixture contains at least one selected from water vapor and sulfur dioxide.

18. In the fluidized-bed device, the improvement as claimed in claim 1 wherein the fluidized-bed device comprises a circulating fluidized-bed boiler.

19. In the fluidized-bed device, the improvement as claimed in claim 18 further comprising a dense fluidized bed of particles operatively connected by a return line to the circulating fluidized-bed boiler wherein the dense fluidized bed of particles includes a heat exchanger and receives solids from the outlet of a cyclone, and wherein the dense fluidized bed of particles further includes at least one secondary feed for injecting an oxygen-enriched mixture into the return line that operatively connects the dense fluidized bed of particles to the circulating fluidized-bed boiler.

20. In the fluidized-bed device, the improvement as claimed in claim 19 wherein the dense fluidized bed of particles is fluidized by a fluidizing gas that is cooled in the heat exchanger before being released to the atmosphere.

21. In the fluidized-bed device, the improvement as claimed in claim 20 wherein the particles of the dense fluidized bed are separated from the fluidizing gas before being injected into the combustion chamber of the fluidizing-bed device.

22. In the fluidized-bed device, the improvement as claimed in claim 21 wherein the particles of the dense fluidized bed are separated from the fluidizing gas by a siphon.

23. In the fluidized-bed device, the improvement as claimed in claim 22 wherein the siphon that is operative to separate the particles of the dense fluidized bed from the fluidizing gas is fluidized by a gas mixture composed of oxygen and carbon dioxide.

24. In the fluidized-bed device, the improvement as claimed in claim 18 further comprising a dense fluidized bed of particles associated with the circulating fluidized-bed boiler and wherein the dense fluidized bed of particles includes at least one secondary feed for injecting an oxygen-enriched mixture above the dense fluidized bed of particles.

25. In the fluidized-bed device, the improvement as claimed in claim 24 wherein the dense fluidized bed of particles is operatively connected by a return line to the circulating fluidized-bed boiler, and the dense fluidized bed of particles further includes at least one secondary feed for injecting an oxygen-enriched mixture into the return line that operatively connects the dense fluidized bed of particles to the circulating fluidized-bed boiler.

26. In the fluidized-bed device, the improvement as claimed in claim 25 wherein the dense fluidized bed of particles is fluidized by at least one selected from air and a component of air.

27. In the fluidized-bed device, the improvement as claimed in claim 25 wherein the dense fluidized bed of particles is fluidized by nitrogen supplied from a cryogenic air separation unit.

* * * * *